(12) United States Patent
Srivastava et al.

(10) Patent No.: US 10,325,017 B2
(45) Date of Patent: Jun. 18, 2019

(54) SYSTEM AND METHOD FOR CONTEXTUAL RESUME SEARCH AND RETRIEVAL BASED ON INFORMATION DERIVED FROM THE RESUME REPOSITORY

(75) Inventors: Rajiv Radheyshyam Srivastava, Maharashtra (IN); Girish Keshav Palshikar, Maharashtra (IN)

(73) Assignee: TATA CONSULTANCY SERVICES LIMITED, Mumbai, Maharashtra (IN)

(*) Notice: Subject to any disclaimer, the term of this patent is extended or adjusted under 35 U.S.C. 154(b) by 340 days.

(21) Appl. No.: 13/370,340

(22) Filed: Feb. 10, 2012

(65) Prior Publication Data
US 2012/0246168 A1  Sep. 27, 2012

(30) Foreign Application Priority Data
Mar. 21, 2011 (IN) .................. 820/MUM/2011

(51) Int. Cl.
*G06F 17/00* (2019.01)
*G06F 17/27* (2006.01)
*G06Q 10/10* (2012.01)
*G06F 16/31* (2019.01)

(52) U.S. Cl.
CPC ........ *G06F 17/2745* (2013.01); *G06F 16/313* (2019.01); *G06Q 10/1053* (2013.01)

(58) Field of Classification Search
CPC .................................................. G06F 16/313
See application file for complete search history.

(56) References Cited

U.S. PATENT DOCUMENTS

| | | | |
|---|---|---|---|
| 5,758,324 A * | 5/1998 | Hartman et al. | 705/1.1 |
| 6,338,056 B1 * | 1/2002 | Dessloch et al. | 707/711 |
| 6,874,002 B1 | 3/2005 | Peleus et al. | |
| 7,711,573 B1 | 5/2010 | Obeid | |
| 7,809,751 B2 | 10/2010 | Fuerst et al. | |
| 7,822,732 B2 | 10/2010 | Bodapati | |
| 8,463,810 B1 * | 6/2013 | Rennison | 707/771 |
| 2002/0116391 A1 | 8/2002 | Nadkarni | |
| 2003/0225761 A1 * | 12/2003 | Wagener | G06F 17/30477 |
| 2005/0049852 A1 * | 3/2005 | Chao | 704/9 |
| 2005/0216295 A1 * | 9/2005 | Abrahamsohn | 705/1 |
| 2006/0195465 A1 * | 8/2006 | Atchison | G06F 17/30011 |
| 2008/0010274 A1 * | 1/2008 | Carus et al. | 707/5 |
| 2009/0089277 A1 * | 4/2009 | Cheslow | G06F 17/30401 |
| 2009/0327249 A1 * | 12/2009 | Pappas | 707/3 |
| 2010/0174719 A1 * | 7/2010 | Vilches | G06F 17/30867 707/741 |
| 2012/0078879 A1 * | 3/2012 | Shuma | G06F 17/30321 707/715 |
| 2012/0117082 A1 * | 5/2012 | Koperda et al. | 707/748 |

* cited by examiner

*Primary Examiner* — Tyler J Torgrimson
(74) *Attorney, Agent, or Firm* — Thompson Hine LLP

(57) ABSTRACT

A computer-based system and method for intelligent resume search on online repositories is disclosed. The parameters in the resumes and the attributes related to the said parameters are identified and extracted by scanning the resumes sequentially and are stored in an index file. Search queries are constructed based on accepted query parts as input. The index file is indexed to locate the parameters relevant to the search queries. An initial score is assigned to the parameters located which is transformed to new score based on identifying additional domain intelligence in the derived attributes related to the located parameters. Finally, the resumes relevant to the parameters with the transformed score are retrieved and displayed.

10 Claims, 3 Drawing Sheets

SYSTEM AND METHOD FOR CONTEXTUAL RESUME SEARCH AND RETRIEVAL BASED ON INFORMATION DERIVED FROM THE RESUME REPOSITORY

FIELD OF THE INVENTION

The invention generally relates to the field of text mining. More particularly, the invention relates to a method and system for contextual resume search and retrieval that is based on attributes derived from the resumes stored in a resume repository.

BACKGROUND OF THE INVENTION

There has been a rapid growth in the availability and retrieval of information through the World Wide Web. The web contains large volume of data that is stored in database data structures such as database tables or indexes or files. The data stored may be of different formats, different types, and may contain different domain-specific information.

Search engines such as Google™, Yahoo® etc are used to search through the large volume of data to retrieve results that are relevant to the user searching using the search engines. Most of these types of search engines provide set of results that are based on keywords used by the user in the search queries formulated for searching over the web.

Most of the users tend to search the information from the web that is relevant to the domain in which they are interested. So, while searching users normally use keywords and variants thereof to obtain relevant set of results. However, it is possible that the same keywords may have different meaning in different context and the results obtained as a result of search may not be relevant to the user-specific domain. Thus, information retrieval from large volume of data with different formats, types and context is a problematic and a tedious task.

Search engine frameworks play a key role in data mining for recruitment process. In a conventional online recruitment process, candidates seeking an employment submit their resumes to employer's job-portals or third-party's online job-boards that provides information about available vacancies and the eligibility criteria for the opening positions. Then the employers access these resumes to select the potential candidates based on skills, experience, qualifications of the candidates seeking request for employments in the employer's organization. However, this conventional process tends to be tedious, manual and time-consuming due to lack of uniformity in the data submitted by the job aspirants.

For a job aspirant employee interested in searching job, the task is to identify the potential employers looking for candidates that match her skills, to identify the exact number of openings and to monitor which employers are most likely to recruit etc. Thus, this approach is a trial and miss approach with the possibility of ending up with no identification of potential openings and interested job. The job aspirant may further end up spending manual efforts, money and time by repeatedly performing search over the search engines available until he is selected.

For an employer in order to identify the potential candidates, the task is to scan through the set of resumes uploaded on the employer's portal or obtained through different online job-boards. It requires herculean efforts and time to scan through the resume details and to evaluate the capabilities or skills of the candidates seeking request for employment. Further, resumes available may be in different file formats and may require assessing the terminology and formats to check the relevance of the candidate's domain and area of expertise. This can become a time consuming and tedious task. Consequently, the employer may end up overlooking potential or qualified candidates and end up selecting unqualified or comparatively inferior skilled candidates.

Thus, there is a need for efficient and intelligent search mechanism that searches relevant information from the large set of resumes available online or stored in an employer's job portal. Considering the example of resume searching over internet, there is a need for search mechanism that enables contextual search and identification of the resumes matching the user specified criteria. Efforts have been made in the past for implementing intelligent search mechanism for efficient searching and extracting data of interest to the user. Some of the inventions known to us are as follows:

The applications such as Daxtra, Resume Mirror applications use text extraction techniques to extract entities of interest from the resume database and store the extracted entities of interest in the xml files or databases.

U.S. Pat. No. 6,874,002 by Peleus, et al disclose a computer based system and method for creating a standardized or normalized resume format, extracting resume information from the normalized resume, and automatically inputting the resume information into a resume database.

U.S. Pat. No. 7,711,573 by Obeid disclose a method and system for managing a resume database wherein for each of the skill and experience related phrases in the resume, the said system computes the range of actual experience with context to the use of phrase in the resume. Further, the said experience computed is stored in the resume database which can be captured by the recruiter while finding resumes that satisfy the required job description.

U.S. Pat. No. 7,822,732 by Bodapati disclose a system that uses parameterized search scripts and configuration information along with user input search string to build search engine independent and search engine dependent queries from one or more search engines to provide relevant results to user.

U.S. Pat. No. 7,809,751 by Fuerst, et al disclose a method and apparatus for searching database data structure wherein the said database is populated with criteria relevant to specific domain interested to a user and generating search results using the said criteria.

US20020116391 by Nadkarni, Uday P disclose an online skill management system comprising a database containing fields related to employment criteria such as experience, skills, education etc wherein the prospective employer can access the system to compare the skill-sets of different individuals on the said database.

There are certain limitations that are observed in the above mentioned prior art that are as follows:

- The results or hits retrieved using conventional search may not be relevant to the information in which the user is interested.
- There is no feasibility for searching the resume by using derived attributes like total experience, skill-wise experience, domain-wise experience etc.
- The additional domain intelligence in the form of searching resumes based on domain area, technology skills, roles and services are not supported.
- The prior arts follow "Extract and then search approach". This step of extraction takes significant time.
- The information stored in the XML database or other relational databases needs to be searched using SQL queries and hence require significant amount of time in retrieving results.

The search on the known search engines is limited to search documents and files based on appearance of the keywords or terms in the content of the documents or files.

Thus, the above discussed prior arts and the state of the art in general lack the relevancy in delivering resumes instantaneously to an employer interested in searching resumes of potential candidate on a local repository of resumes. Similarly, the results displayed to the user may not be always relevant to the user. This is because of lack of use of additional domain specific criteria by the employer for searching and retrieving resumes with exact relevance within domain in which he is interested.

Some of the prior arts do disclose using additional criteria such as domain-specific information for resume search. However, these criteria are stored in XML database and it takes more time for extracting such criteria from XML databases using SQL queries and hence is less efficient.

Also, the results obtained using the state of art resume search mechanism may not obtain the search results and rank them based on skill-wise experience, domain-wise experience, and total experience due to lack of computing these attributes form the content of the resumes. The state of art is only restricted to identifying additional criteria such as domain, skill, qualification etc and is unable to monitor or derive attributes related to these criteria. Deriving attributes related to the criteria such as domain, skill, designation, qualification etc from the resume content itself and using these attributes for searching may result in further enhancing the intelligent resume search mechanism.

In view of above, there is a need for a system and method for intelligent search mechanism that enables domain-specific search with improved efficiency and time required for retrieving content specific search results.

OBJECTIVES OF THE INVENTION

The principal objective of the present invention to provide a method and system that enables intelligent resume search mechanism for searching the relevant resume from a resume repository.

Another objective of the invention is to enable automatic identification, extraction and indexing of one or more parameters and attributes related to the said parameters from the resume repository in an index file.

Another objective of the invention is enable acceptance of query parts as input for searching the resumes in the resume repository.

Another objective of the invention is to enable formulation of a search queries based on accepted input.

Yet another objective of the invention is to search the index file to obtain the parameters matching the search criteria in the formulated search queries.

Another objective of the invention is to assign a score to the parameters matching the formulated search queries in the index file.

Yet another objective of the invention is to transform the score of the parameters matching the search queries based on the transformation of score of the attributes related to the parameters.

Still another objective of the invention is to retrieve search results relevant to the parameters with the transformed score.

SUMMARY OF THE INVENTION

Before the present methods, systems, and hardware enablement are described, it is to be understood that this invention in not limited to the particular systems, and methodologies described, as there can be multiple possible embodiments of the present invention which are not expressly illustrated in the present disclosure. It is also to be understood that the terminology used in the description is for the purpose of describing the particular versions or embodiments only, and is not intended to limit the scope of the present invention.

The present invention provides method and system for intelligent resume search mechanism that allows domain specific search. In the present invention, the resume stored in the resume repository is processed sequentially for identifying and extracting the parameters such as projects, role, skills, experience etc in the resume. The parameters are identified using extensive syntactic and keyword based pattern analysis. The invention has the feasibility of deriving attributes related to such parameters. Further, the parameters identified and the attributes derived are indexed in a single index file for all the resumes stored in the resume repository.

The search queries are formulated based on input accepted as query parts for searching resume from the resume repository. Then the index is searched for locating the parameters matching the formulated search queries. The parameters matching the formulated search queries are assigned an initial score. Further, this score is transformed to new score based on additional domain intelligence identified in the derived attributes related to the parameters. Finally, the relevant resumes corresponding to the parameters with the new score are retrieved.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and architecture disclosed in the drawings.

DETAILED DESCRIPTION OF THE INVENTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described. The disclosed embodiment is merely exemplary of the invention, which may be embodied in various forms. The scope of the invention is not restricted to the listed embodiments and is limited only by the appended claims.

The present invention enables a time-efficient domain-specific resume search mechanism that provides relevant information in the form of resume details to the employer interested in searching the resumes in that particular domain.

Figure 1:
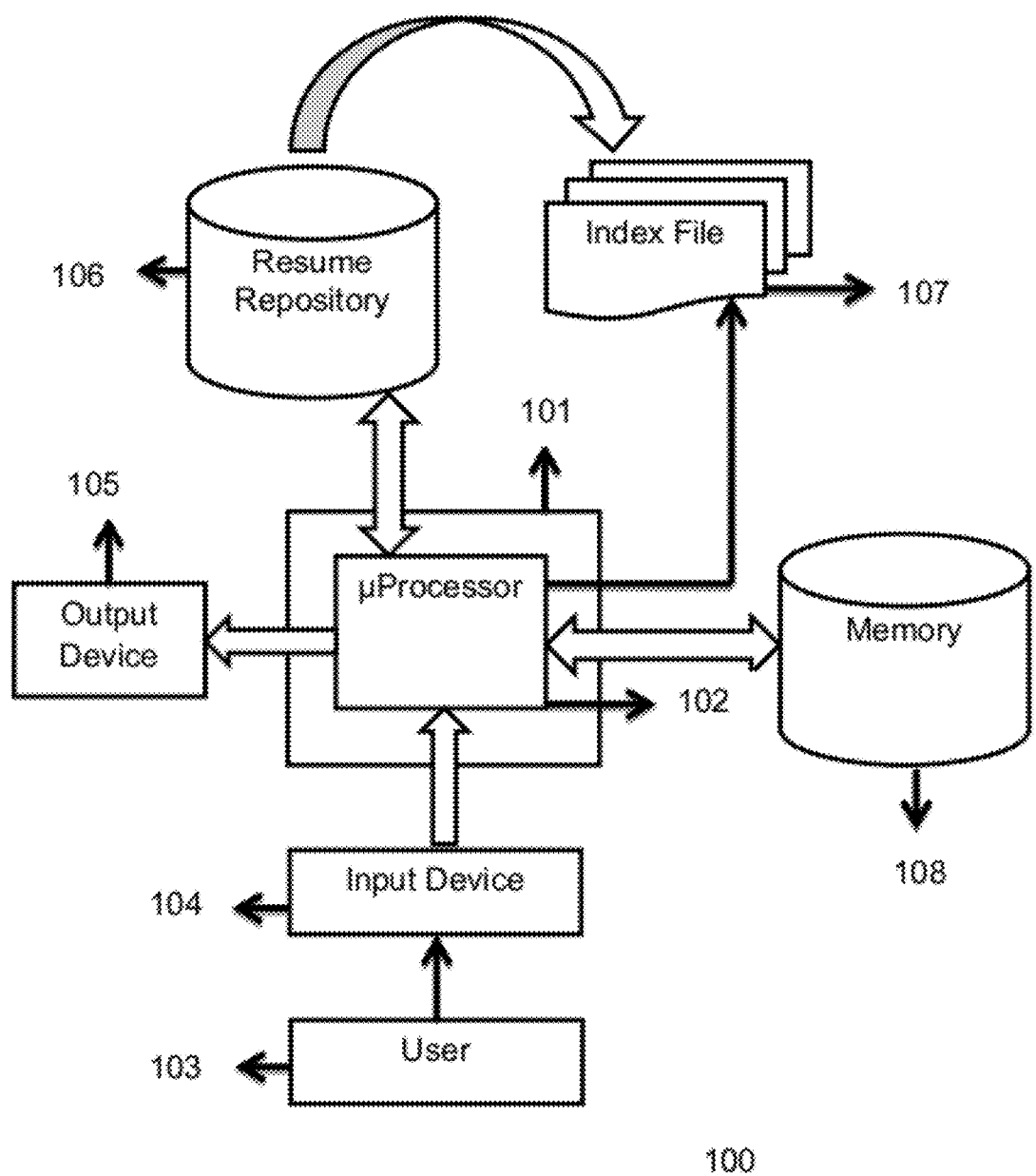
FIG. 1 schematically shows a system 100 performing intelligent resume search mechanism in accordance to an exemplary embodiment of the invention.

FIG. 1 refers to a system 100 consisting of various hardware elements which collectively achieve the task of intelligent search mechanism according to exemplary embodiment of the present invention. As shown in the FIG. 1, there is provided a computing system 101 further comprising a processor 102, input device 104 used as input medium for a user 103 for requesting data, output device 105 for displaying information and a memory 108 storing instructions that are executed for allowing the processor 102 to perform various tasks related to intelligent resume search.

The computing system 101 may include but is not limited to a workstation, a desktop computer, a mobile computer, PDA, a laptop computer, a server, a client, an embedded system, etc. The computing system 101 is connected to a resume repository 106 to which user 103 is allowed access to request resume in which he is interested in. The said resume repository 106 may be included in the computing system 101 as a separate logical device or it may be interconnected to the computing system using a network connection. The said network may include local area networks (LAN), metropolitan area networks (MAN), wide area networks (WAN), the Internet, or any combination thereof "Internet" or its variations such as a private Internet, a secure Internet, a value-added network, a virtual private network, a portion of the Internet such as the World Wide Web, or an intranet.

The input device 104 may include but not limited to devices such as keyboard, joystick, pointing device such as mouse. Further, the output device 105 may include but not limited to devices such as a computer monitor or a display screen of a communication device.

An index file 107 is shown in the FIG. 1 that is used for extraction and storage of parameters and attributes derived from the resumes stored in the resume repository 106. The resume repository 106 stores the resumes of candidates seeking assistance to the candidates looking for jobs in their domain. The resume repository 106 may be managed and monitored by a resume warehouse which has contracts with the prospective employers or companies those are in hunt of recruiting potential candidates for their organization. Though, a single user is shown in the FIG. 1, the invention is not limited to the single user accessing the resume repository 106.

Multiple users such as employers, jobseekers, etc can connect to the resume repository 106 using different communication links. The different communication links may include a wire line or a wireless communication, a RF communication, a satellite communication, a telephone communication, internet communication, a local area network or wide area network connection etc or a combination of these. If the internet connection is used as a communication link, then it may be understood that precautions in the form of encryption algorithms may be implemented for security measures against harmful viruses, frauds, network hacks etc. These encryption algorithms do not form the scope of the present invention and therefore are not discussed in detail.

Figure 2:
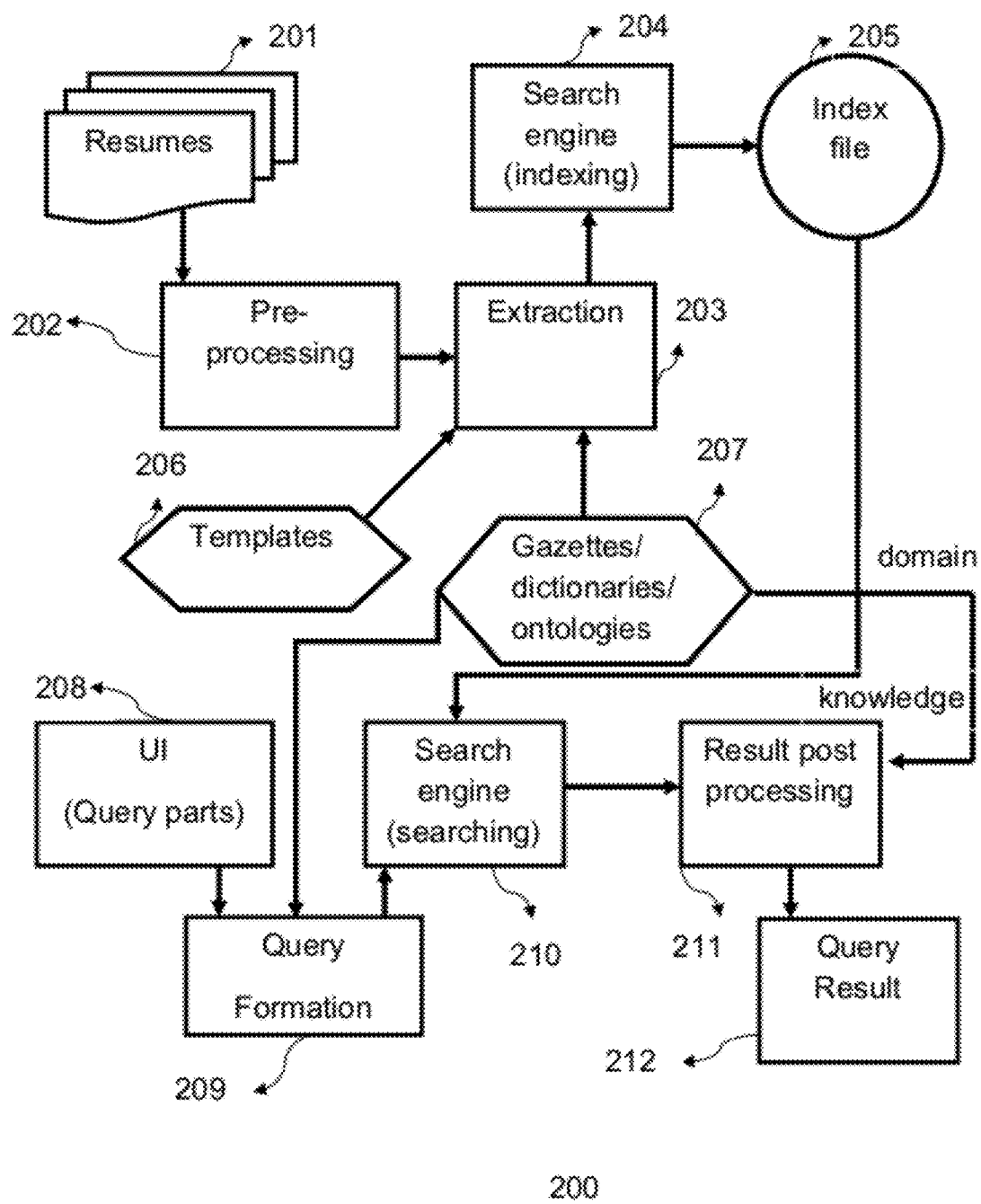
FIG. 2 shows a block diagram 200 schematically displaying the steps followed in carrying out the intelligent search mechanism in accordance to an exemplary embodiment of the invention.

The steps performed by the processor 102 of the computing system 101 for carrying out the intelligent resume search will now be described. FIG. 2 shows a block diagram 200 depicting the pre-processing and post-processing steps implemented by the processor in accordance with the exemplary embodiment of the current invention.

As shown in FIG. 2, a resume repository 201 is present that stores multiple resumes of the candidates seeking assistance for employment. The resumes of any format can be stored on the said resume repository 201. In the pre-processing step 202, all the resumes stored in the resume repository 201 are processed sequentially to intelligently identify parameters related to each of the resumes in the resume repository 201. Also, the attributes related to the parameters are derived in the pre-processing step 202. For example, in one embodiment one of the parameters may include the skill set of the candidate and the corresponding attribute related to the skill set as parameter may include duration or period for which such skill set was practiced by the candidate as disclosed in the resume of the said candidate.

In another embodiment, the parameters in the resume may include the qualification and the year in which the candidate obtained the said qualification. In still other embodiments, the criteria may include but are not limited to:
Work experience
Project experience
Project count
Role in the project
Technology used in the projects
Domain of the project work
Service line
Location of work
Educational Degree
Salary
Designation For each of the parameters, the attributes are derived. The derived attributes identifies additional domain-specific intelligence for each of the said parameters. These parameters are identified by using syntactic and keyword based pattern analysis. As shown in FIG. 2, templates 206 are stored in the processor memory to identify the parameters based on pattern analysis. In the syntactic or semantic pattern approach, the sentences in the resumes are parsed according to rules and definitions to identify the parameters related to the resumes. For example, if the sentence in a resume states that "I am working in . . . " may be interpreted as the parameter related to the resume as domain of work. Similarly, the other content in the resume is analyzed syntactically and semantically to identify and extract the entities of interest. On the contrary, in case of keyword based pattern analysis, the keywords and terms expressed in the resume are interpreted to identify the parameters related to resumes stored in the repository 201. These parameters are extracted using extraction step 203 as shown in FIG. 2.

Moreover, the variants, synonyms, equivalents and combinations thereof of the parameters are identified and extracted using the gazettes or dictionaries or ontologies framework 207 as indicated in FIG. 2.

In an embodiment of the invention, the extracted parameters and the attributes derived related to the parameters is indexed using search engine indexing step 204. This information for all the resumes are extracted and indexed in the single index file 205 as shown in the FIG. 2. Thus, if the parameter identified in one of the resume is a domain of work, then the synonyms, equivalents and combinations thereof related to domain of work is also indexed in the index file 205. Further, the attributes derived related to domain of work is also indexed. For example if the domain of work is banking, then the resumes having parameters related to hierarchy of the banking domain such as consumer banking, internet banking, personal banking etc is indexed. Also, the derived attributes such as work experience in number of years is computed for each of the banking domain and indexed in the index file 205.

In another example, if the resume being processed is of software domain, then the parameters identified may be qualification, work experience, technology of expertise and the variants of these parameters which are indexed. In this scenario also, the attributes are derived for each parameter and indexed in the index file.

A user interface 208 is provided for a user desired to search for resume from the resume repository. The user interface provides various options for forming query parts for searching the resume. For example, in addition to the keywords and terms used as one query part, drop-down menus accessible to the user can be provided to collect additional query parts such as domain of work, qualification, work experience, project types etc from the user.

These query parts are used for formulating search queries in the Query formation step 209 as shown in FIG. 2. While formulating search queries, the templates 206 and gazettes or dictionaries or ontologies framework are referred to include the synonyms, variants, equivalents of the query parts as entered by the user. This is done to capture the resumes with equivalent parameters related to the search queries from the resume repository.

The next step is to search parameters matching with the formulated search queries using search engine searching process 210. The parameters extracted using pre-processing step 202 is searched in the index file 205 that match with the formulated search queries. In this process, each parameter indexed in the file is monitored and the parameters that match with the formulated search queries are located. The parameters located are assigned an initial score based on the relevancy of the parameters to the criteria in the formulated search queries.

For example, if the formulated search queries include search for software programmer, then the parameters matching these queries such as software programmer will be assigned a score of 1, software developer will be assigned 0.75, software analyst will be assigned a little less score. This can be configured according to the requirement of the search. All the parameters in the index file matching the search queries will be assigned an initial score based on the relevancy with the queries formulated.

In the post-processing step 211, the derived attributes stored in the index file related to the parameters relevant to the formulated search queries are identified. An additional score for the attributes derived is added to the initial score to transform the initial score to a new score. For example, for the parameter software developer, the work experience in software domain in various organizations derived as an additional attribute during indexing is identified during searching and post-processing and the score of the parameter software developer is transformed to a new score called overall score by considering the score of the attribute work experience in software domain.

As shown in the FIG. 2, in the post-processing operation 211, the gazettes, dictionaries and ontologies framework 207 are used to identify the correct attributes and combinations thereof relevant to formulated search queries that enables for the correct relevance with-in domain for searching using the domain knowledge obtained in the identified attributes.

Similarly, for each parameter identified relevant to the formulated search queries, additional attributes are identified and the initial score of each parameter is modified to the new score or the overall score.

The transformed score may thus include an individual parameter score with the addition of attribute score. The overall score may be function of summation of score of each parameter with derived attribute or the function of an individual parameter with its derived attribute. This is dependent on the query parts received as input based on which the overall score is interpreted as summation of score of each individual parameters or an individual parameter score.

For example, if the formulated search queries includes domain, experience, qualification as query parts then the initial score will be assigned to parameters relevant to these query parts. The initial score is transformed to overall score containing the summation of score of each of the parameters with additional score of the derived attributes derived for these parameters.

On the contrary, if the formulated search queries include query part as domain then the parameters in the index file related to domain will be assigned an initial score transformed to new score after addition of attribute score related to parameters related to the domain. Thus, there is a feasibility to assign a weightage to different parameters while selecting query parts in the user interface for formulating search queries for searching the exact resumes of interest in the resume repository.

Finally, the query result will include the results with the parameters with the overall score. That is resumes corresponding to the parameters with the transformed overall score are retrieved. The index file contains file names of various resumes in the resume repository linked with one or more parameters related to the resumes. Thus, the resumes corresponding to the parameters with transformed overall score are retrieved from the resume repository and displayed as query result 212.

Hence, "the index and then search approach" is achieved rather than "extract and then search approach" as observed in the conventional prior art. This helps in saving extraction related time and the present invention requires relatively small indexing time. Further, the resumes closely matching the user specified criteria are retrieved quickly and in efficient manner.

Figure 3:
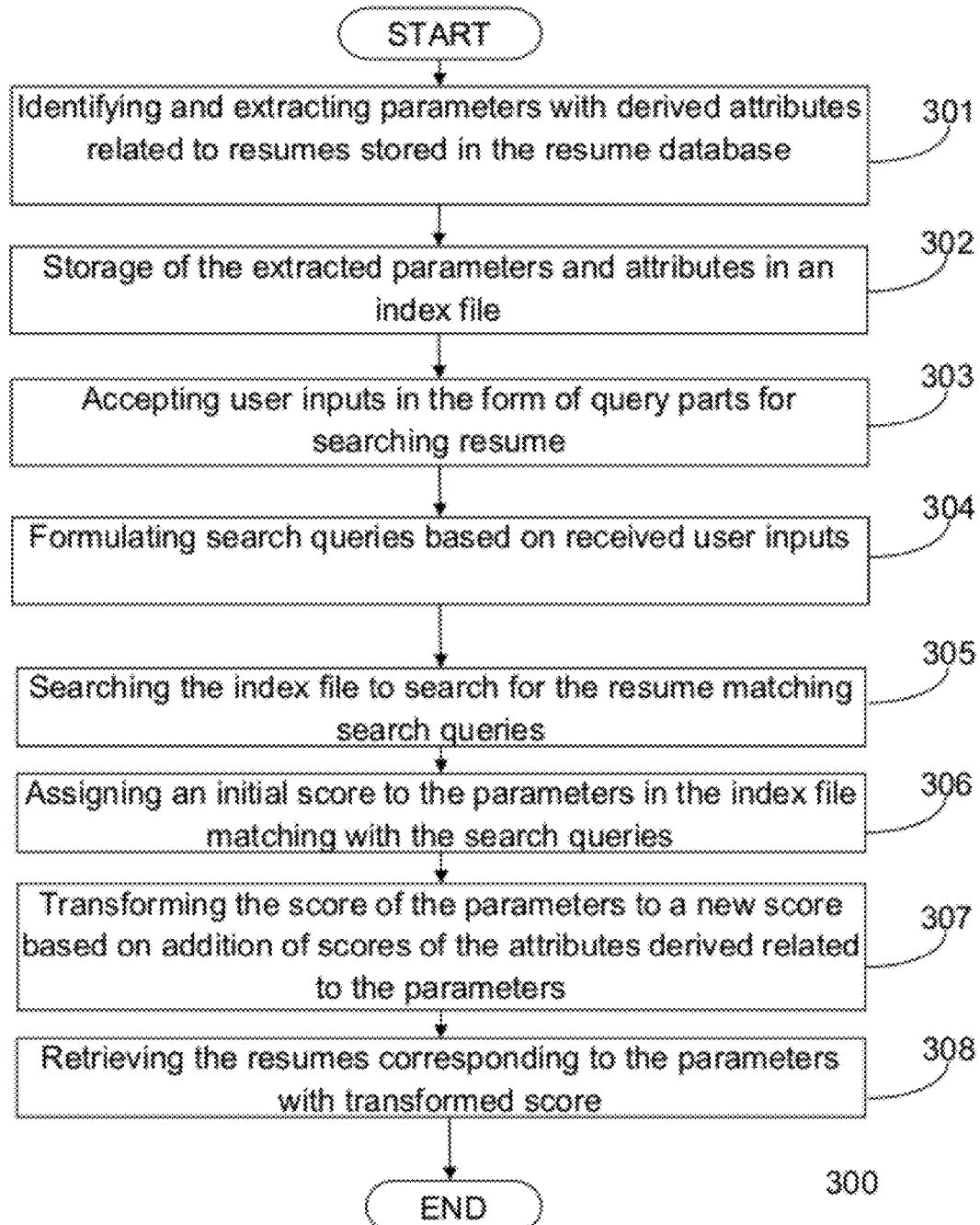
FIG. 3 is a flow chart 300 describing the pre-processing and post-processing operations carried out for the efficient intelligent search in accordance to an exemplary embodiment of the invention.

FIG. 3 shows a flow chart 300 describing pre-processing and post-processing steps followed by the processor in implementing resume search algorithm according to an exemplary embodiment of the invention.

At step 301, identification and extraction of parameters in the resumes from the resume repository along with the derived attributes for such parameters is done by processing the resumes sequentially.

At step 302, the extracted parameters and related attributes in the resumes are stored in an index file maintained for search engine indexing.

At step 303, user inputs in the form of query parts are received from a user.

At step 304, formulation of search queries takes place based on inputs received from the user.

At step 305, the index is searched to locate the parameters matching with the formulated search queries.

At step 306, the parameters matching the formulated search queries are assigned an initial score.

At step 307, transformation of score of the parameters matching the search queries to a new score is implemented with the addition of score of derived attributes related to these parameters in the initial score.

At step 308, the query results in the form of resumes corresponding to the parameters with transformed score are retrieved.

Thus, the above implemented pre-processing and post-processing steps help in an efficient intelligent resume search mechanism that provides result in relatively less time as it does not extract resume from XML databases and refers to the index file for getting the additional information about the resumes in the resume database. The idea of indexing the resume with entities of interest being identified during indexing and then searching using the additional derived information saves time, storage space and provides relevant results to the user.

ADVANTAGES OF THE INVENTION

The present invention has following advantages:
The generic search is enhanced to perform resume search based on the given criteria which identifies set of entities of interest.
The additional domain intelligence data such as domain area, skills, roles and services are used for resume search.
Avoidance of extraction stage needed in other approaches for intelligent resume selection matching a criterion.
The extraction output is not stored in any external media like those implemented in "Extract and then Search approach". Only a single index file is created which contain search related information for large number of resumes stored in the resume repository.
Independent of specific resume formats and converts the resume of any format into a standard text format.
Computation of derived attributes such as total experience, skill-wise experience, domain-wise experience etc is possible.
Provision of adding custom-intelligence while searching is supported.
Shortens the time and efforts required to short-list the right candidate for given set of positions.
Saves storage space and reduces the size of application required for resume search process.

The description has been presented with reference to an exemplary embodiment of the invention. Persons skilled in the art and technology to which this invention pertains will appreciate that alterations and changes in the described method and apparatus of operation can be practiced without meaningfully departing from the principle, spirit and scope of this invention.

We claim:

1. A method for contextual resume search and retrieval of resumes, the method comprising processor implemented steps of:
   pre-processing resumes stored in a resume repository by:
      identifying a first set of parameters from the resumes, wherein the first set of parameters are identified by sequentially performing syntactic, semantic and keyword based pattern analysis on the resumes using templates, wherein the first set of parameters comprise work experience, project experience, project count, Role in the project, technologies used in the projects, a domain of the project work, a service line, a location of work, educational degree, salary and a designation;
      identifying equivalents of the first set of parameters using gazettes, dictionaries, and ontologies framework; and
      deriving attributes for the first set of parameters, wherein the derived attributes are indicative of domain-specific intelligence information derived from the resumes, and wherein the domain-specific intelligence information comprises a domain area, a technology, skills, a designation, qualification, roles and services, wherein the derived attributes comprise a hierarchy of domain, total work experience, skill-wise experience, and domain-wise experience;
   storing the first set of parameters, the equivalents of the parameters and the derived attributes for the first set of parameters and all the search related information associated with the resumes in a single index file without saving in any external media or a database;
   indexing the first set of parameters, the equivalents of the first set of parameters, and the derived attributes for the first set of parameters and combinations thereof directly in the single index file maintained for search engine indexing, wherein the single index file is in communication with the processor, and wherein the single index file contains file names of the resumes stored in the resume repository, and wherein the file names are linked with the identified parameters in the single index file;
   accepting one or more query parts from at least one user in order to search for relevant resumes based upon the query parts;
   identifying equivalents of the query parts using the templates, the gazettes, the dictionaries and the ontologies framework;
   formulating search queries based upon the query parts and the equivalents of the query parts;
   searching only in the single index file without accessing the repository or any database to locate a second set of parameters and a second set of derived attributes and combinations thereof matching with the search queries;
   assigning an initial score to each of the second set of parameters matched and an additional score to the second set of derived attributes;
   transforming the initial score of each of the second set of parameters to an overall score by adding the additional score of the second set of derived attributes to the initial score of each of the second set of parameters; and
   retrieving relevant resumes corresponding to the second set of parameters from the single index file based upon the overall score.

2. The method of claim 1, wherein the query parts comprise search related keywords, terms in combination with information related to the searching of the relevant resumes, wherein the information comprises role, experience, qualifications, and skills.

3. The method of claim 1, wherein the initial score is assigned based on a number of appearances of each parameter, numeric range of each parameter and combinations thereof.

4. The method of claim 1, wherein the overall score is a function of one of the initial score of two or more parameters matched, and the initial score of an individual parameter matched.

5. The method of claim 4, wherein the overall score is the function of the initial score of the two or more parameters matched when the search queries are relevant to the two or more parameters matched.

6. The method of claim 4, wherein the overall score is the function of the initial score of the individual parameter matched when the search queries are relevant to the individual parameter matched.

7. A system for contextual resume search and retrieval of resumes, the system comprising:
a processor; and
a memory coupled to the processor, wherein the processor executes programmed instructions stored in the memory in order to:
pre-process resumes stored in a resume repository to:
extract a first set of parameters from the resumes, wherein the first set of parameters are identified by sequentially performing syntactic, semantic and keyword based pattern analysis on the first set of resumes using templates, wherein the first set of parameters comprise work experience, project experience, project count, a role in the project, technology used in the projects, domain of the project work, a service line, a location of work, an educational degree, salary and a designation;
identify equivalents of the first set of parameters using gazettes, dictionaries, and ontologies framework; and
derive attributes for the first set of parameters, wherein the derived attributes are indicative of domain-specific intelligence information derived from the resumes, and wherein the domain-specific intelligence information comprises a domain area, technology, skills, a designation, a qualification, roles and services, wherein the derived attributes comprise a hierarchy of domain, a total work experience, a skill-wise experience, and a domain-wise experience;
directly store the first set of parameters, the equivalents of the first set of parameters and the derived attributes for the first set of parameters and all the search related information associated with the resumes in a single index file without saving in any external media or database;
index the first set of parameters, the equivalents of the first set of parameters, and the derived attributes directly in the single index file maintained for search engine indexing, wherein the single index file is in communication with the processor and wherein the single index file contains file names of the resumes stored in the resume repository, and wherein the file names are linked with the identified parameters in the single index file;
accept one or more query parts from at least one user in order to search for relevant resumes based upon the query parts;
identify equivalents of the query parts using the templates, the gazettes, the dictionaries and the ontologies framework;
formulate search queries based upon the query parts and the equivalents of the query parts;
search only in the single index file without accessing the repository or any database to locate a second set of parameters and a second set of derived attributes and combinations thereof matching with the search queries;
assign an initial score to each of the second set of parameters matched and an additional score to the second set of derived attributes;
transform the initial score of each of the second set of parameters to an overall score by adding the additional score of the second set of derived attributes to the initial score of the initial score of each of the second set of parameters; and
retrieve relevant resumes corresponding to the second set of parameters based upon the overall score.

8. The system of claim 7, wherein the overall score is a function of one of the initial score of two or more parameters matched, and the initial score of an individual parameter matched.

9. The system of claim 8, wherein the overall score is the function of the initial score of the two or more parameters matched when the search queries are relevant to the two or more parameters matched.

10. The system of claim 8, wherein the overall score is the function of the initial score of the individual parameter when the search queries are relevant to the individual parameter matched.

* * * * *